Patented Dec. 22, 1942

2,306,351

UNITED STATES PATENT OFFICE 2,306,351

γ-ACETYL-γ-ISOPROPENYL PIMELIC ACID AND METHOD FOR ITS PREPARATION

Herman A. Bruson, Philadelphia, Pa., assignor to to The Resinous Products & Chemical Company, Philadelphia, Pa., a corporation of Delaware No Drawing. Application December 2, 1941, Serial No. 421,314

3 Claims. (Cl. 260—537)

This invention relates to γ-acetyl-γ-isopropenyl pimelic acid,

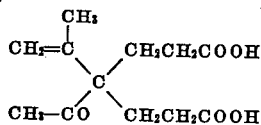

a new compound which is a useful intermediate for the preparation of plasticizers and synthetic resins.

According to this invention, γ-acetyl-γ-isopropenyl pimelic acid is obtained by hydrolyzing γ-acetyl-γ-isopropenyl pimelonitrile which is, in turn, obtained by condensing mesityl oxide with acrylonitrile in the presence of alkaline condensing agents, as described in copending application Serial No. 389,332, filed April 19, 1941, of which this application is a continuation-in-part.

The hydrolysis is carried out by boiling γ-acetyl-γ-isopropenyl pimelonitrile in the presence of aqueous mineral non-oxidizing acids such as hydrochloric or sulfuric acid, or in the presence of alkalies such as sodium hydroxide or potassium hydroxide solutions so as to eliminate ammonia completely. The salts thus obtained may be converted to the desired acid upon acidification. It is surprising that under such drastic conditions of hydrolysis, very little cleavage of the rest of the molecule occurs.

In order to illustrate this invention, the following example is given:

*Condensation of mesityl oxide and acrylonitrile*

A mixture consisting of 98 g. of mesityl oxide, 100 g. of tertiary butanol and 5 g. of aqueous 40% trimethyl benzyl ammonium hydroxide was cooled to 5–10° C. and rapidly stirred while there was added dropwise 106 g. of acrylonitrile during the course of 1¾ hours, during which time the reaction temperature was maintained between 5° and 10° C. The mixture was then stirred for 1½ hours longer at 5° to 10° C. and finally neutralized with dilute hydrochloric acid. The crystalline product was filtered off by suction, washed with a little ice-cold ethanol, and air-dried. The yield was 150 grams of crude γ-acetyl-γ-isopropenyl pimelonitrile

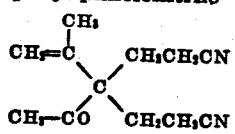

which, after recrystallization from methanol, formed colorless crystals melting at 116–117° C.

*Hydrolysis of γ-acetyl-γ-isopropenyl pimelonitrile*

A mixture consisting of 96 g. of sodium hydroxide, 1000 cc. of water, and 204 g. of γ-acetyl-γ-isopropenyl pimelonitrile was boiled under reflux for five hours. The solution was mixed with a little bleaching charcoal, then cooled to about 50° C., and filtered. The filtrate was acidified at 5–10° C. with concentrated hydrochloric acid until it gave a blue color with Congo Red indicator. The precipitated γ-acetyl-γ-isopropenyl pimelic acid, after recrystallization from water, formed colorless crystals melting, when pure, at 136–137° C. The yield was 163 grams. An additional amount of this acid was recovered from the mother liquors.

In place of sodium hydroxide there may be used an equivalent proportion of potassium hydroxide, or there may be used aqueous sulfuric acid or hydrochloric acid of about 25–35% strength. The alkaline hydrolysis is preferred because its use avoids any tendency to form lactones or tars.

I claim:

1. As a new compound, γ-acetyl-γ-isopropenyl pimelic acid

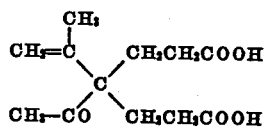

which, when pure, consists, of colorless, water-soluble crystals melting at 136–137° C.

2. A method of preparing γ-acetyl-γ-isopropenyl pimelic acid which comprises hydrolyzing γ-acetyl-γ-isopropenyl pimelonitrile.

3. A method of preparing γ-acetyl-γ-isopropenyl pimelic acid which comprises hydrolyzing γ-acetyl-γ-isopropenyl pimelonitrile by means of aqueous alkali metal hydroxide solution and acidifying the hydrolysate.

HERMAN A. BRUSON.